United States Patent [19]
Harris, Jr.

[11] Patent Number: 6,017,142
[45] Date of Patent: Jan. 25, 2000

[54] DECORATIVE FIBER OPTIC TREE

[76] Inventor: Wilson Harris, Jr., 14800 University Ave., Dolton, Ill. 60419-2329

[21] Appl. No.: 09/012,661

[22] Filed: Jan. 23, 1998

[51] Int. Cl.[7] ........................................................ F21S 1/00
[52] U.S. Cl. .......................... 362/564; 362/568; 362/805; 362/806; 362/567
[58] Field of Search ................................... 362/122, 123, 362/806, 568, 551, 554, 583, 564, 563, 565, 567, 805

[56] References Cited

U.S. PATENT DOCUMENTS

| | | | |
|---|---|---|---|
| 3,532,874 | 10/1970 | Rosenast | 362/568 |
| 5,558,422 | 9/1996 | Sanford | 362/32 |
| 5,702,170 | 12/1997 | Broderick | 362/32 |

*Primary Examiner*—Sandra O'Shea
*Assistant Examiner*—Ismael Negron
*Attorney, Agent, or Firm*—Goldstein & Canino

[57] ABSTRACT

A decorative fiber optic tree formed of a plurality of light conducting optical fibers, each having a first end and a second end. The fiber optic tree includes a base unit having an interior chamber to house a light source. The light source is arranged to produce light that is directed through an opening on an upper surface of the base unit. An elongated and perforated center tube may be included having a top end and a bottom end, and is substantially vertically oriented. The center tube, which is removeably mounted on the base unit, is positioned at least in part over the opening in the upper surface of the base. The optical fibers are disposed partially within the center tube with the first end of each fiber located near the bottom end of the center tube and suitably positioned to enable light from the light source passing through the opening to be coupled into each respective optical fiber. The optical fibers extend partially up the interior of the center tube, with each passing through a respective perforation and extend radially outwardly from the center tube. The light coupled into the first end of each optical fiber is transmitted through the optical fibers to the second where light is emitted to produce a decorative effect.

1 Claim, 2 Drawing Sheets

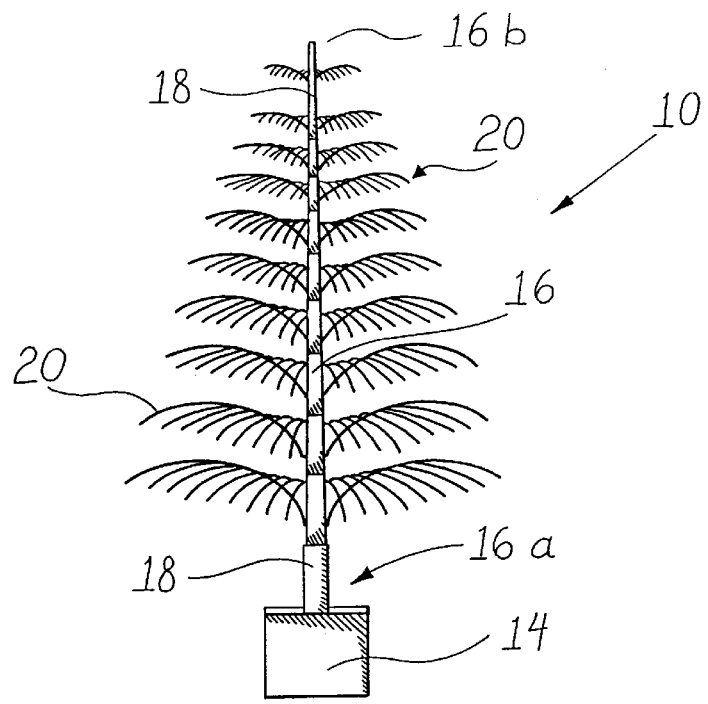
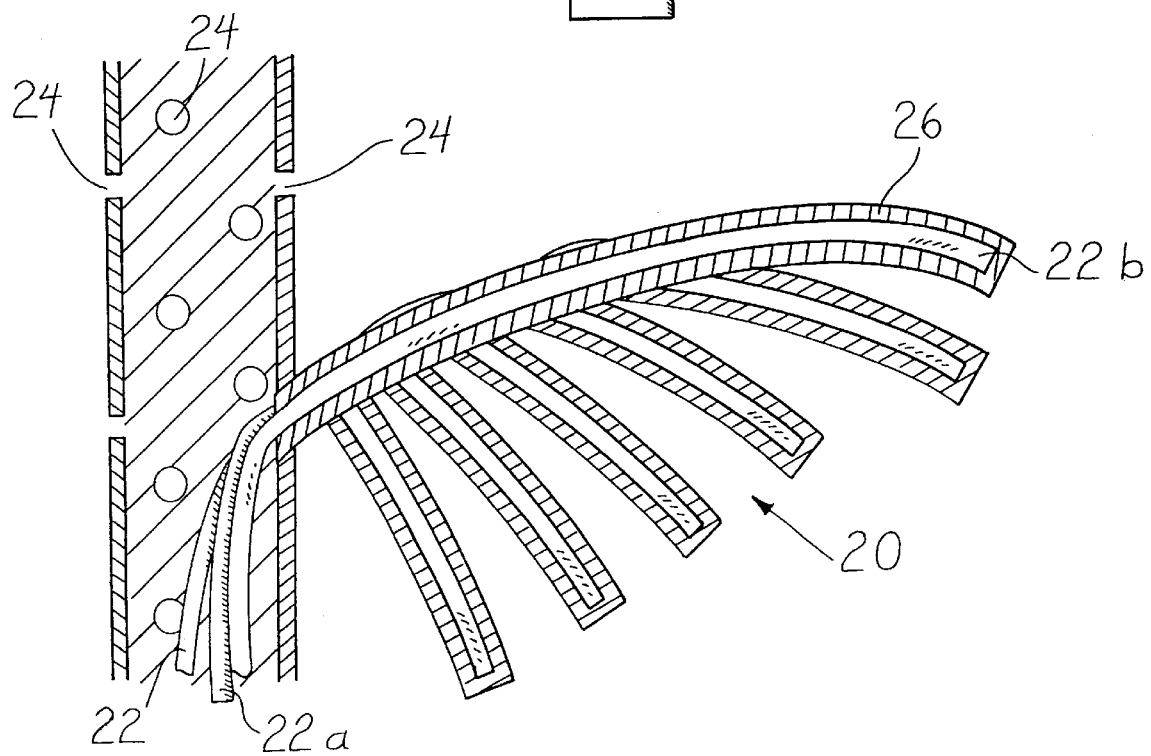

DECORATIVE FIBER OPTIC TREE

BACKGROUND OF THE INVENTION

1. Field of the Invention

The invention relates to decorative and or holiday accessories. More particularly the present invention relates to a decorative fiber optic tree suitable for use, for example, as a Christmas tree, which emits light from a plurality of optical fibers composing the tree.

2. Background and Objects of the Invention

The use of ornamental and decorative items during the holiday season is well established in the art. One very common and traditional item that is used by many individuals is the ubiquitous 'Christmas Tree', typically realized by a (somewhat) fresh-cut evergreen tree having a substantially conical or pyramidal shape. Such trees are often decorated with ornaments, lights, tinsel, etc., to produce a desired ornamental impression.

There are several problems that have been identified with the use of real or live Christmas and holiday trees. First, a live tree is cut and utilized for a very short period of time, and subsequently discarded. Unsold trees are simply thrown out, which is a somewhat significant waste of natural resources. Also, it has long been known, that the use of candles and bulbs, typically used to decorate such trees, can represent in a fire hazard. It is not uncommon to hear of fires during holiday seasons caused by such arrangements. The use of live (real) trees also can consume significant time to purchase, transport, and mount the tree in a suitable stand. In addition, often such trees are fully decorated. Those familiar with live trees can also attest to the mess that is produced as the tree dries out and pine or evergreen needles drop from the tree.

More recently, quality artificial trees have been made available and are known in the art. These trees can be expensive, while still employing the use of ornaments, lights, and other decorative and ornamental items. Therefore, these trees still require a large amount of time to setup and decorate. Those skilled in the art will appreciate that typically almost as much time is spent removing and storing lights and ornaments employed to decorate holiday trees than was be needed to initially decorate such trees.

Objects of the present invention are, therefore, to provide a new and improved holiday and or decorative tree having one or more of the following capabilities, features, advantages, and/or characteristics:

- a tree not requiring the addition of decorative lights and or ornaments;
- constructed of light conducting optical fibers;
- having an base with an integral light source;
- a type of 'artificial' tree that is easy to setup and later take down and store;
- very reusable;
- having incorporated therein a means to emit one or more colors from the optical fibers;
- providing a means to vary the colors emitted by respective optical fibers;
- eliminates or reduces the waste of destroying natural evergreen trees;
- simple and economical construction.

The above listed objects, advantages, and associated novel features of the present invention, as well as others, will become more clear from the description and figures provided herein. Attention is called to the fact, however, that the drawings are illustrative only. Variations are contemplated as being part of the invention, limited only by the scope of the appended claims.

SUMMARY OF THE INVENTION

In accordance with the invention, a decorative fiber optic tree is provided including a base unit having an interior chamber to house a light source. The light source is disposed within the interior chamber and is arranged to produce light that is directed through an opening on an upper surface of the base unit. An elongated and perforated center tube may be included having a top end and a bottom end, and is substantially vertically oriented. The center tube is removeably mounted on the base unit and positioned over the opening in the upper surface. Also included are a plurality of light conducting optical fibers having a first end and a second end. The optical fibers are disposed partially within the center tube with the first end of each fiber located near the bottom end of the center tube and suitably positioned to enable light from the light source passing through the opening to be coupled into each respective fiber. The optical fibers extend up the interior of the center tube, at least partially, and pass through a respective perforation with the second end extending radially outwardly from the center tube. The light coupled into the first end of each optical fiber is transmitted through the fiber to the second where light is emitted to produce a decorative effect. The light source may be configured with a motor having a low speed output shaft with a disk comprised of a plurality of colored regions mounted to the shaft. The disk is suitably positioned so that light from the light source passes through the disk before passing through the opening. Accordingly, as the disk is rotated on the shaft of the motor, each region may be sequentially rotated past the light source to vary the color of the light coupled to the light conducting optical fibers.

BRIEF DESCRIPTION OF THE DRAWINGS

In the drawings, like elements are depicted by like reference numerals. The drawings are briefly described as follows.

FIG. 1 provides a front or side view of an embodiment of the fiber optic tree of the present invention.

FIG. 2 illustrates a conceptual cross section view of an embodiment of a branch of the fiber optic tree.

LIST OF REFERENCE NUMERALS USED IN THE DRAWINGS

Figure 3:
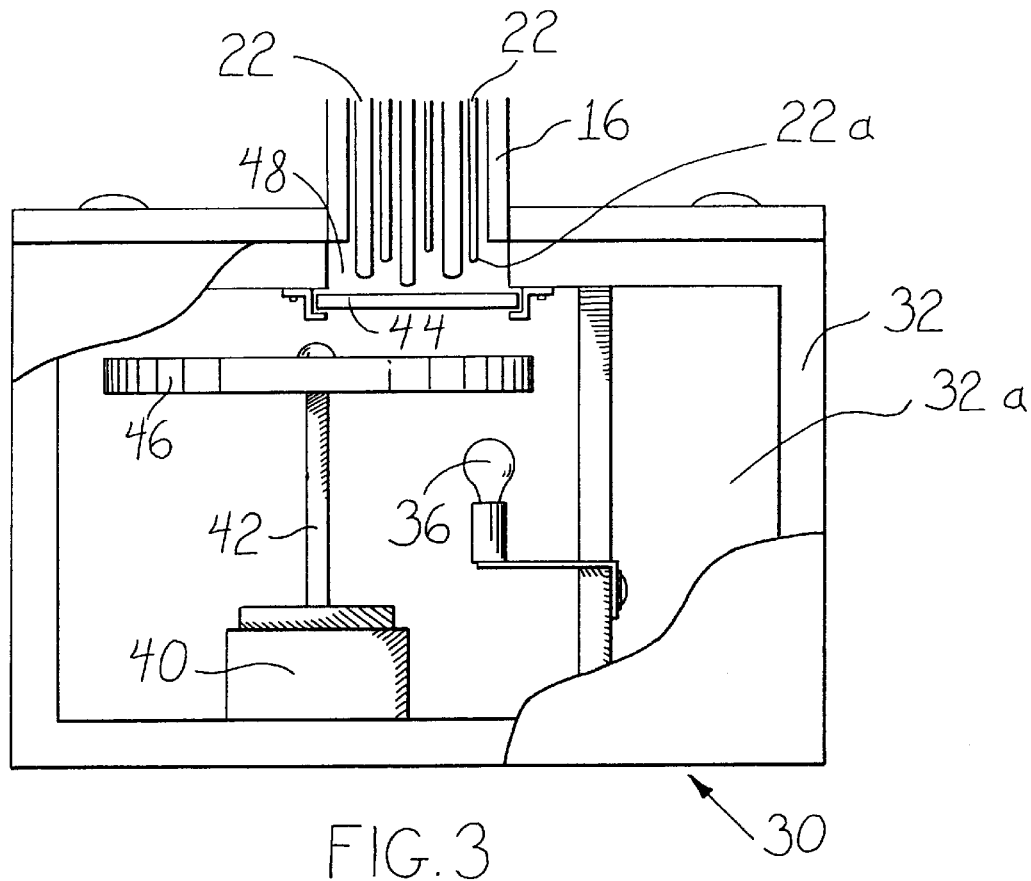
FIG. 3 provides a partially cut away view of a base unit employable with the invention.

10—fiber optic tree (or tree)
14—base unit
16—center tube
16a—bottom end (of center tube)
16b—top end (of center tube)
18—segment of the center tube
20—branch of the fiber tree
22—(light conductive) optical fiber
22a—first end of optical fiber
22b—second end of optical fiber
24—perforation (in the center tube 16)
26—(decorative) fiber cover means
30—base unit
32—housing 32a—interior chamber (of housing 32)
36—light emitting device
40—motor
42—shaft
46—(transparent) disk
46a—colored region comprising the disk 46
46b—(another) colored region of the disk 46
48—opening in upper surface of the base unit 30

DETAILED DESCRIPTION OF THE PREFERRED EMBODIMENTS

It is important to establish the definition of several important terms that will be used throughout this disclosure. The term 'fiber optic tree', 'decorative fiber optic tree' and simply 'tree' may be considered synonymous and interchangeable when referring to the tree of the present invention. The term 'transparent' as applied to the regions of the disk 46, which will typically be colored regions, need not necessarily imply the regions are 'clear transparent' providing an undistorted view when looking therethrough. The term 'light source' may be assumed to indicate any source capable of producing visible light, and will generally include a light producing or light emitting device. Finally, the terms 'fiber' and 'optical fiber' may be assumed to indicate any suitable optically transmissive material that will conduct light from a first (input) end to a second (output) end, and emit light from the second end in a decorative manner.

Referring now to FIG. 1, there is provided a front or side view of an embodiment of the fiber optic tree 10 of the present invention. As can be seen, the tree 10 may be comprised of a plurality of branches 20, which would typically he arranged to provide a pyramidal shape. Each branch 20 may be formed by a single optical fiber 22, or a combination of optical fibers 22 (as seen in FIG. 2). Further, the optical fibers 20 may be covered by a fiber cover means 26 to enhance and make more attractive the overall appearance of the fiber optic tree 10. The fiber optic tree 10 also includes a base unit 14, which may have removeably fixed thereto a center tube 16. The center tube 16, which is included in a preferred embodiment of the invention, is contemplated to be perforated, may be tapered (as shown), and further may be comprised of a plurality of segments 18. As shown, the center tube 16 has a bottom end 16a and a top end 16b.

As can be seen in FIGS. 1 and 2, the optical fibers 22 are partially disposed within the center tube 16, with a first end 22a located near the bottom end of the center tube. Accordingly, the optical fibers 22 extend up the interior of the center tube, at least partially, and then pass through a respective perforation of the center the 16, with a second end 22b positioned to extend radially outward from the center tube 16, to provide a tree-like appearance.

Referring again to FIG. 2, there is shown therein a plurality of perforations 24, through which the respective optical fibers 22 pass and radially extend outwardly. It should be noted that it is contemplated that the fiber optical tree 10 of the present invention may be constructed without the center tube 16, by harnessing the respective portions of the optical fibers 22 to form a central trunk or trunk-like portion, say, employing a suitable wrap or harnessing material (not shown).

Turning now to FIG. 3, there is illustrated a partially cut away view of a base unit 30 employable with the invention. The base unit 30 is comprised of a housing 32 having an interior chamber 32a. Although shown having a rectangular box-like shape, the housing 32 may be configured in other shapes including cylindrical or conical. The interior chamber, which may actually be comprised of several chambers, may be employed to house a 'light source'. The light source is included as a source of optically detectable energy wherein the light is produced or emitted by a light emitting device 36. In a preferred embodiment, the light emitting device 36 may be provided by an incandescent bulb, a laser diode or tube, or other known devices. Those skilled in the art will appreciate the variety of known means available to provide the required light emitting device 36. The light produced by the light emitting device 36 is to be at least partially coupled to the first end 22a of each optical fiber 22. This coupling may be direct or facilitated by items such as lens 44 or suitable filters (not shown), as required. The coupled light is then transmitted along the optical fibers 22 and emitted from the second end 22b of the fibers to produce a decorative effect.

Figure 4:
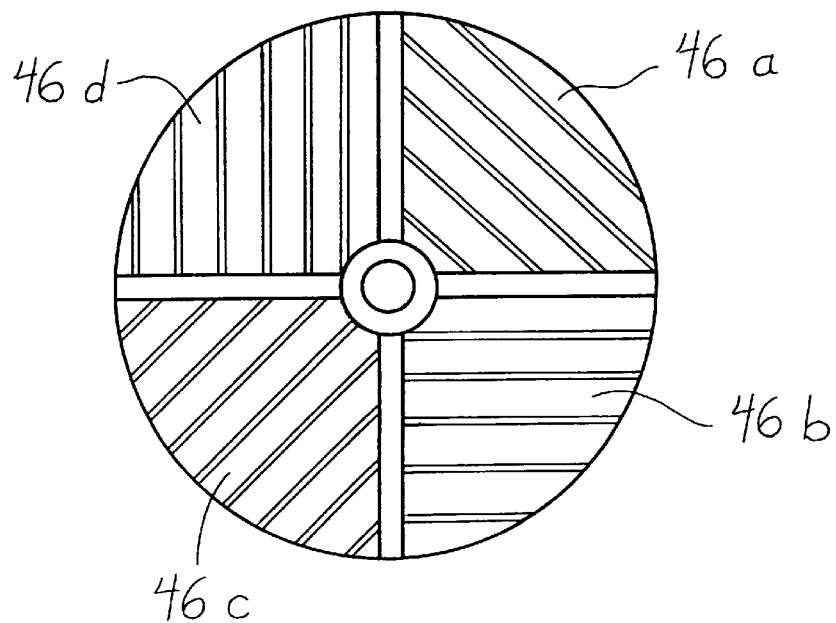
FIG. 4 depicts an embodiment of a disk composed of four colored regions in accordance with the present invention.

As can be seen in FIGS. 3 and 4, in a preferred embodiment of the invention a disk 46 may be included that is formed of transparent or translucent material comprised of a plurality of colored regions, such as colored regions 46a, 46b, 46c, and 46d. The disk is to be suitably positioned so that light from the light source passes through the disk before passing through an opening 48 in the upper portion of the base unit 30. The disk 46 may be rotatably mounted on a low speed output shaft 42 of a motor 40 to enable each region to be sequentially rotated past the light emitted from the light emitting device to vary the color of the light coupled to the light conducting optical fibers 22. In addition, it is contemplated that additional means (known in the art) may be included to cause the rotation of the disk 46 to be paused for a predetermined temporal period once a respective colored region is positioned between the light source and the opening. The pausing of the rotation of the disk would maintain each particular color, available via the colored regions of the disk, for the predetermined temporal period. A typical temporal period may be from 2 to 10 seconds.

It should be noted that the light source, including disk 46, may be configured to simultaneously produce light of a plurality of distinct colors and thereby causing light of one color to be coupled to, and emitted form a first respective plurality of optical fibers 22, while light of another color is (simultaneously) emitted form another respective plurality of fibers. For example, if a smaller disk 46 is employed and a more sophisticated arrangement is employed to couple the light passing through each colored region to the optical fiber 46, the fiber optical tree 10 may be configured to emit more than one color at one instant. Skilled persons may provide other light source arrangements that are within the scope of the present invention.

It is important to understand that the above description of the optical fiber tree 10 of the present invention is exemplary only, and other equivalent arrangements may be provided by skilled artisans. Therefore, while there have been described the currently preferred embodiments of the present invention, those skilled in the art will recognize that other and further modifications may be made without departing from the present invention, and it is intended to claim all modifications and variations as fall within the scope of the invention.

What is claimed is:

1. A fiber optic decorative tree, comprising:
   (a) a base unit having an interior chamber;
   (b) a light source disposed within the interior chamber of the base unit, light produced by the light source directed through an opening on an upper surface of the base unit;

(c) an elongated and perforated center tube having a top end and a bottom end, the center tube being substantially vertically oriented, and removeably mounted on the base unit so as to be positioned, at least in part, over the opening, said center tube is tapered with the bottom end having a greater diameter than the top end; the center tube being segmented wherein the diameter of successive segments decreases from the bottom of the center tube to the top of the center tube;

(d) a plurality of light conducting optical fibers having a first end and a second end, the optical fibers disposed partially within the center tube with the first end of each fiber located near the bottom end of the center tube and suitably positioned to enable light from the light source passing through the opening to be suitably coupled into each respective optical fiber; the optical fibers extending up the interior of the center tube, at least partially, and passing through a respective perforation, the size of each perforation may be one selected from a predefined number of available sizes to accommodate one or more optical fibers, with the second end extending radially outwardly from the center tube, with light emitted from the second end of the optical fibers to produce a decorative effect;

(e) a motor with a low speed output shaft;

(f) a disk comprised of a plurality of colored regions formed of transparent material suitably positioned so that light from the light source passes through the disk before passing through the opening, the disk rotatably mounted on the shaft of the motor to enable each region to be sequentially rotated past the light source to vary the color of the light coupled to the light conducting optical fibers, wherein the rotation of the disk is paused for a predetermined temporal period once a respective colored region is positioned between the light source and the opening, the pausing of the disk maintaining each particular color made available via the colored regions of the disk for the predetermined temporal period.

* * * * *